UNITED STATES PATENT OFFICE.

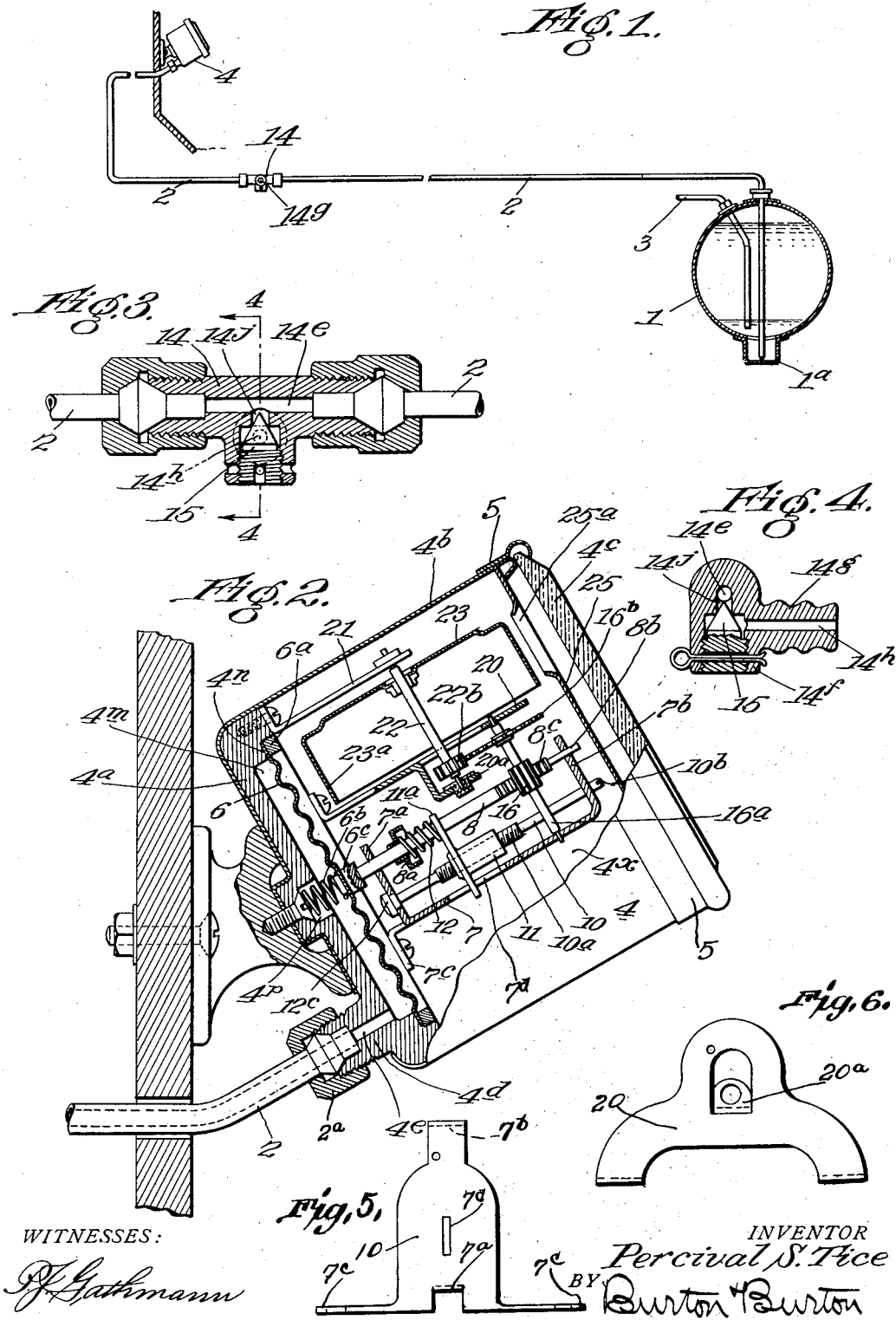
P. S. TICE.
PNEUMATIC LIQUID SUPPLY TANK GAGE.
APPLICATION FILED SEPT. 2, 1920.
1,392,538. Patented Oct. 4, 1921.
WITNESSES:
P. H. Gathmann
INVENTOR
Percival S. Tice
BY Burton & Burton
HIS ATTORNEYS

PERCIVAL S. TICE, OF CHICAGO, ILLINOIS.

PNEUMATIC LIQUID-SUPPLY-TANK GAGE.

1,392,538.              Specification of Letters Patent.         Patented Oct. 4, 1921.

Application filed September 2, 1920. Serial No. 407,747.

*To all whom it may concern:*

Be it known that I, PERCIVAL S. TICE, a citizen of the United States, and a resident of the city of Chicago, in the county of Cook and the State of Illinois, have invented certain new and useful Improvements in Pneumatic Liquid-Supply-Tank Gages, of which the following is a specification, reference being had to the accompanying drawings, forming a part thereof.

The purpose of this invention is to provide an improved device for the purpose of indicating the contents of a liquid supply tank at a distance from said tank. It consists in the elements and features of construction shown and described, as indicated in the claims.

In the drawings:

Figure 1 is a partially diagrammatic view showing the liquid tank and connections therefrom embodying this invention, the same being shown as mounted on an automobile for indicating in sight of the driver at the dashboard the liquid contents of a fuel supply tank in the rear of the car.

Fig. 2 is a partly sectional side elevation of the indicator which is the characteristic element of the apparatus shown in Fig. 1, section being made axially of the casing and of the exhaust connection thereto of the tank.

Fig. 3 is an axial section of a fitting employed in the connections, Fig. 2.

Fig. 4 is a section at the line, 4—4, on Fig. 3.

Figs. 5 and 6 are elevations of certain brackets.

In the drawings 1 is the main liquid fuel supply tank of an automobile whose liquid contents may be indicated by the gage device hereinafter described. 2 is the air pipe line connecting the tank, 1, with the indicator. $1^a$ is a sump at the bottom of the tank, into which sump the pipe line, 2, opens at its lower end. 3 is the fuel supply pipe from the tank, 1, for supplying the carbureter. 4 is the casing of the indicator. It comprises a base member or back, $4^a$, a cylindrical inclosing shell, $4^b$, a glass front, $4^c$, with suitable means as, the ring, 5, for retaining it to close the face end of the indicator casing. The back, $4^a$, has a projecting boss or pipe fitting connection seen at $4^d$, axially bored as seen at $4^e$, for air connection and counterbored to receive the end of the flexible metal tube, 2, which constitutes the connection, as stated, to the tank. $2^a$ is a familiar type of coupling for connecting the tube, 2, to the hollow boss, $4^d$. At a convenient point in the horizontal extent of the pipe line, 2, there is interposed a fitting, 14, having a side boss, $14^g$, at right angles to the axial passage, $14^e$, of the fitting, and at right angles to said boss, $14^g$, and at right angles also to the passage, $14^e$, there is a second side boss, $14^f$. The two bosses, $14^g$ and $14^f$, have intersecting bores, $14^j$ and $14^h$, and the bore, $14^h$, is continued across the bore, $14^j$, to intersect the bore, $14^e$, of the boss, $14^g$, and is counterbored to form a valve seat beyond the intersection of the bore, $14^j$, the counterbore being threaded to receive the threaded valve, 15, seating at said seat to cut off communication from the bore, $14^h$, to the bore, $14^e$. As will hereinafter be described, the valve will be opened only for originally producing a partial vacuum in the space $4^m$, provided for that purpose behind the diaphragm 6, as hereinafter explained and as it is otherwise desirably held securely closed, there is provided a cotter pin extending through the boss and the valve stem for locking the valve in closed position.

The base or back member, $4^a$, of the casing is recessed on its inner side at $4^m$, and rabbeted around the margin of that recess at $4^n$, for seating on said rabbet the flexible diaphragm, 6, suitably retained and caused to make an air-tight junction with its seat by means of a retaining ring, $6^a$. At the center of the back, $4^a$, there is lodged in a recess, $4^p$, one end of the coil spring, $6^b$, whose opposite end seats at the center of the diaphragm, tending to resist the collapse of the latter into the recess, $4^m$.

Upon the base or back member, $4^a$, there is mounted a bracket, 7, having a right-angular bent end, $7^a$, facing the center of the diaphragm; and a lug, $7^c$, struck and bent out from the bracket serves to carry a rigid finger or arm, $7^b$, parallel to the right-angular bent end, $7^a$, of the bracket, and in said two parts, $7^b$ and $7^a$, there is mounted a thrust shaft, 8, one end of which engages against a button, $6^c$, at the center of the diaphragm, 6. In the two arms, $7^a$, and $7^b$, there is journaled a shaft, 10, which is longitudinally stopped in one direction by a head, 12$^c$, encountering the arm, 7$^a$, and which is threaded over the middle portion of its length, as seen at 10$^a$, and on said shaft, at said threaded portion, there is mounted for adjustment therealong by rotation of the shaft, an interiorly-threaded sleeve, 11, carrying a spring stop bar, 11$^a$, one end of which is apertured to permit the shaft, 8, to extend through it while the other end is engaged with the bracket, 7, by extending through a slot, 7$^d$, therein, whereby the said spring stop bar is prevented from turning on the threaded shaft, 10, and is moved longitudinally on said shaft and on the thrust shaft, 8, by the rotation of the shaft, 10.

A spring, 12, coiled about the shaft, 8, reacts between the stop bar, 11$^a$, and a stop collar, 8$^a$, secured on said shaft, 8, tending to thrust the stop bar, and thereby the shaft, 10, outwardly, which thrusting action is prevented by the head, 12$^c$, on the inner end of the shaft, 10; and said shaft requires no other means for positioning it, because the spring, 12, is always acting against the stop arm in one direction in which its thrust is resisted by the head of the shaft, 10, which reaction of the spring, therefore, tends in fact to thrust the shaft 8, inwardly toward the diaphragm, and to flex the diaphragm into the chamber, 4$^m$, against the resistance of the spring, 6$^b$. The shaft, 8, at its outer part has a rack, 8$^c$, which engages a gear pinion, 16, on a shaft, 16$^a$, which is journaled at one end in the bracket, 7, and at the opposite end in a bracket, 20, which is also mounted upon the base or head, 4$^a$, of the casing. Also mounted on said head is a third bracket, 21, and in said bracket and in an offset arm, 20$^a$, of the bracket, 20, there is journaled a shaft, 22, carrying a flanged disk or cup, 23, whose cup-wall or flange, 23$^a$, constitutes an indicator, carrying upon its outer surface graduations which may be in inches of depth of liquid in the fuel supply tank, said flange being positioned for oscillating past a reading opening, 25$^a$, in a face plate, 25, back of the glass, 4$^c$. A pinion, 22$^b$, on the shaft, 22, meshes with a gear, 16$^b$, on the shaft, 16$^a$, for rotating the disk, 23, according to the longitudinal movement of the shaft, 8, whose rack, 8$^c$, communicates the rotary movement through the train of gears described, to said graduated disk, 23.

The mode of operation of this device may now be understood as follows:

With the liquid level in the tank, 1, at the lowest point at which fuel can be supplied to the carbureter, suction is applied by any means not shown, through the suction connection 14$^h$ of the boss, 14$^g$, thereby drawing liquid from the sump, 1$^a$, up into the pipe, 2. When the liquid reaches the port controlled by the valve, 15, the valve is tightly closed and locked. There then exists in the chamber, 4$^m$, back of the diaphragm, and in the portion of the duct, 2, leading thereto from the valve, 15, partial vacuum or sub-atmospheric pressure which is measured by the height of the liquid column which has been lifted to the valve, 15. This partial vacuum causing the diaphragm to be withdrawn into the chamber, 4$^m$, through the train commencing with the rack, 8$^c$, rotates the indicator disk. The operator will now adjust the shaft, 10, by means of a screw-driver engaging the exposed head to withdraw or force inward the spring stop until the figure, 0, on the indicating disk appears at the side opening. Now when the tank is filled with the liquid to the determined upon maximum height, the column in the pipe, 2, is counter-balanced to the extent of the depth of the liquid in the tank, the liquid moving on in the tank, 2, toward the chambers, 4$^m$, and thereby the partial vacuum is reduced, the pressure in the recess, 4$^m$, approaches atmospheric, the diaphragm moves, and the thrust shaft, 8, is thrust, in the direction for rotating the indicator disk, 23, to disclose a certain numeral at the sight opening, which should be the number indicating the maximum depth of liquid to which the tank is filled. As the liquid is exhausted from the tank and the level recedes, the resulting increase of partial vacuum behind the diaphragm causing it to be retracted, will rotate the indicator disk correspondingly, and the disk being properly calibrated, in respect to its graduation, the number showing at the reading opening will indicate the remaining depth of liquid in the tank.

For the purpose of the indication of depth of liquid in the tank, there would be no necessity for the horizontally-extending portion of the pipe, 2, but for the fact that the expansion of the air or vapor in this pipe, due to changes of temperature, if the pipe had no horizontal portion, would tend to change the height of the liquid standing in the pipe independently of the height of liquid in the tank. When, however, the horizontal portion of pipe is provided having always a portion beyond the liquid therein which is occupied by air, the expansion of the air forcing back the liquid in the tank will not force it back beyond the horizontal portion or into the vertical portion; and therefore, this expansion or contraction of the air due to change of temperature, will not change the height of the liquid column in the pipe, because at the lowest level of liquid in the tank, the vertical portions of the pipe, and some portion of some of its horizontal extent is occupied by liquid.

I claim:—

1. In combination with a liquid supply tank, means for indicating the liquid contents thereof, comprising a pressure-communicating tube leading from the bottom of the liquid-containing space of the tank; a pressure-gage device comprising a chamber having a yielding wall, said tube leading to said chamber and comprising *en route* thereto a substantially horizontal part located above the high liquid level of the tank, said chamber having an exhaust connection whereby partial vacuum may be produced therein for elevating liquid from the tank to said horizontal part of the conduit, and a capacity registering device connected to the yielding wall of the chamber.

2. In the construction defined in claim 1, foregoing, the yielding wall of the chamber being a diaphragm, and a spring associated with said diaphragm for yieldingly resisting the inward movement or collapse of the diaphragm due to suction in the chamber.

3. In the construction defined in claim 1, foregoing, a spring in the chamber reacting against the moving wall to expand the chamber; a thrust member stepped against the outer side of the moving wall, and a spring reacting thereon to resist the expansion of the chamber, the registering device being operatively connected with said thrust member for indicating the expansion and contraction of the chamber.

4. In the construction defined in claim 1, foregoing, a spring in the chamber reacting against the moving wall to expand the chamber; a thrust member stepped against the outer side of the moving wall, and a spring reacting thereon to resist the expansion of the chamber, the registering device being operatively connected with said thrust member for indicating the expansion and contraction of the chamber, and means for adjusting the tension of the last mentioned spring.

5. In the construction defined in claim 1, foregoing, the registering device comprising a thrust member lodged against the yielding wall; a rack and pinion operated by said thrust member and an oscillating indicator actuated by the pinion.

6. In the construction defined in claim 1, foregoing, a casing of which the base or back contains the chamber mentioned formed as a recess therein, the moving wall being a diaphragm covering said recess; said casing having an additional chamber at the opposite side of the diaphragm from the recess; a thrust shaft and guide bearings therefor in said second chamber; a spring reacting to yieldingly hold the shaft endwise against the diaphragm, and an oscillating graduated indicator and means for actuating it operated by the back-and-forth endwise movement of the shaft as it follows the diaphragm.

7. In the construction defined in claim 1, foregoing, the registering device comprising a thrust shaft stepped at one end on the moving wall, a spring for yieldingly holding it thereagainst, a stop for the opposite end of the spring and means for adjusting the stop to vary the spring tension.

8. In the construction defined in claim 1, foregoing, the horizontally extending part of the pressure communicating tube having an angle-shaped passage communicating with its axial passage, one branch of said angle shaped passage being arranged for connection with a source of suction for exhausting the chamber and a screwed-in valve set in through the other branch of said angle passage for seating beyond the junction of the two branches of said angle passage to hold the partial vacuum produced in said chamber through said suction connection.

In testimony whereof, I have hereunto set my hand at Chicago, Illinois, this 30th day of August, 1920.

PERCIVAL S. TICE.